US011278081B2

(12) United States Patent
Boudreau et al.

(10) Patent No.: US 11,278,081 B2
(45) Date of Patent: Mar. 22, 2022

(54) ARTICLE OF FOOTWEAR WITH DISPENSED COMPONENTS

(71) Applicant: REEBOK INTERNATIONAL LIMITED, London (GB)

(72) Inventors: Matthew Boudreau, North Attleboro, MA (US); Brian Christensen, Centerville, MA (US); Matthew Costa, Mattapoisett, MA (US); Dennis Gaboriault, Millbury, MA (US)

(73) Assignee: Reebok International Limited, London (GB)

( * ) Notice: Subject to any disclaimer, the term of this patent is extended or adjusted under 35 U.S.C. 154(b) by 20 days.

(21) Appl. No.: 16/156,681

(22) Filed: Oct. 10, 2018

(65) Prior Publication Data

US 2020/0113276 A1    Apr. 16, 2020

(51) Int. Cl.
| | |
|---|---|
| *A43B 13/02* | (2006.01) |
| *A43B 9/00* | (2006.01) |
| *A43B 13/04* | (2006.01) |
| *A43B 13/12* | (2006.01) |
| *A43B 23/02* | (2006.01) |

(52) U.S. Cl.
CPC .............. *A43B 13/023* (2013.01); *A43B 9/00* (2013.01); *A43B 13/04* (2013.01); *A43B 13/12* (2013.01); *A43B 23/025* (2013.01)

(58) Field of Classification Search
CPC ....... A43B 13/023; A43B 13/04; A43B 13/12; A43B 13/206; A43B 13/181; A43B 9/00; A43B 9/16; A43B 9/18; A43B 9/20; A43B 23/025; A43B 1/009; A43B 1/14; A43B 1/04; A43B 1/02; A43B 1/06

USPC .................................................... 36/84, 25 A
See application file for complete search history.

(56) References Cited

U.S. PATENT DOCUMENTS

| | | |
|---|---|---|
| 2,100,492 A | 11/1937 | Sindler |
| 2,325,656 A | 8/1943 | Brophy |
| 3,251,728 A | 5/1966 | Humbert et al. |
| 3,719,965 A | 3/1973 | Chevallereau |
| 4,272,898 A | 6/1981 | Tansill |
| 4,272,989 A | 6/1981 | Rymarchyk et al. |
| 4,431,311 A | 2/1984 | Kolossow |
| 4,536,974 A | 8/1985 | Cohen |
| 4,593,482 A | 6/1986 | Mayer |
| 4,611,412 A | 9/1986 | Cohen |
| 4,753,021 A | 6/1988 | Cohen |
| 4,754,559 A | 7/1988 | Cohen |

(Continued)

FOREIGN PATENT DOCUMENTS

| | | |
|---|---|---|
| CN | 1066620 C | 6/2001 |
| CN | 101820788 A | 9/2001 |

(Continued)

*Primary Examiner* — F Griffin Hall
(74) *Attorney, Agent, or Firm* — Sterne, Kessler, Goldstein & Fox P.L.L.C.

(57) ABSTRACT

A sole for an article of footwear includes a continuous dispensed component forming a first layer and a second layer. The first layer is disposed directly on top of the second layer. The continuous dispensed component forms a medial sidewall and a lateral sidewall. The first layer includes a starting point where the continuous dispensed component is first dispensed. The continuous dispensed component continuously transitions from the first layer to the second layer at the starting point.

19 Claims, 9 Drawing Sheets

(56) References Cited

U.S. PATENT DOCUMENTS

| | | |
|---|---|---|
| 4,952,450 A | 8/1990 | Noel |
| 5,063,018 A | 11/1991 | Fontirroche et al. |
| 5,233,767 A | 8/1993 | Kramer |
| 5,713,140 A | 2/1998 | Baggenstoss |
| 5,916,006 A | 6/1999 | Ganson |
| 6,280,478 B1 | 8/2001 | Richter et al. |
| 6,782,642 B2 | 8/2004 | Knoche et al. |
| 7,192,069 B1 | 3/2007 | Daniel |
| 7,926,204 B2 | 4/2011 | Ungari et al. |
| 8,993,061 B2 | 3/2015 | Jones et al. |
| 2005/0115284 A1* | 6/2005 | Dua .................. A43B 23/042 66/178 R |
| 2006/0288612 A1 | 12/2006 | Lucas et al. |
| 2007/0170610 A1 | 7/2007 | Payne et al. |
| 2007/0266593 A1 | 11/2007 | Schindler et al. |
| 2008/0271339 A1 | 11/2008 | Fischer |
| 2009/0013558 A1 | 1/2009 | Hazenberg et al. |
| 2009/0094858 A1 | 4/2009 | Ungari et al. |
| 2009/0126225 A1 | 5/2009 | Jarvis |
| 2009/0247658 A1 | 10/2009 | Kobayashi et al. |
| 2011/0016746 A1 | 1/2011 | Callahan et al. |
| 2011/0154584 A1 | 6/2011 | Ungari et al. |
| 2011/0232130 A1 | 9/2011 | Boudreau et al. |
| 2012/0180344 A1 | 7/2012 | Crowley, II et al. |
| 2013/0145650 A1 | 6/2013 | Seo |
| 2013/0260104 A1 | 10/2013 | Dua et al. |
| 2014/0020192 A1 | 1/2014 | Jones et al. |
| 2014/0230276 A1 | 8/2014 | Campos, II et al. |
| 2015/0040428 A1* | 2/2015 | Davis .................. A43B 23/0245 36/83 |
| 2016/0219982 A1 | 8/2016 | Waatti |

FOREIGN PATENT DOCUMENTS

| | | |
|---|---|---|
| CN | 1817261 A | 8/2006 |
| DE | 1279314 B | 10/1968 |
| EP | 0130816 A2 | 1/1985 |
| EP | 2684479 A2 | 1/2014 |
| WO | WO 97/03582 A1 | 6/1997 |
| WO | WO 2009057107 A2 | 5/2009 |
| WO | WO 2014100462 A1 | 6/2014 |
| WO | WO 2017083013 A1 | 5/2017 |

* cited by examiner

ARTICLE OF FOOTWEAR WITH DISPENSED COMPONENTS

BACKGROUND

Field

Embodiments of the present invention relate generally to articles of footwear; and more specifically to articles of footwear with dispensed components.

Background

Articles of footwear serve both functional purposes (e.g., protecting and cushioning the wearer's feet) and aesthetic purposes (e.g., for style). In addition to providing shoes that fulfill these purposes, shoe manufacturers seek to improve manufacturing efficiency. Thus, articles of footwear that can be made efficiently while still achieving the wearer's functional and aesthetic needs are desirable.

BRIEF SUMMARY

Articles of footwear with dispensed components are disclosed. The components may be formed via an automated dispensing process that is done robotically. In some embodiments, a sole for an article of footwear includes a continuous dispensed component forming a first layer and a second layer. In some embodiments, the first layer is disposed directly on top of the second layer. In some embodiments, the continuous dispensed component forms a medial sidewall and a lateral sidewall. In some embodiments, the first layer includes a starting point where the continuous dispensed component is first dispensed. In some embodiments, the continuous dispensed component continuously transitions from the first layer to the second layer at the starting point.

In some embodiments, the continuous dispensed component forms additional layers. In some embodiments, the second layer is disposed directly on top of the additional layers. In some embodiments, the starting point is disposed at a midfoot of the sole.

In some embodiments, the continuous dispensed component forms a perimeter of the sole. In some embodiments, the sole also includes an additional dispensed component disposed within the perimeter of the sole. In some embodiments, the sole also includes a non-dispensed component disposed within the perimeter of the sole.

In some embodiments, an article of footwear includes an upper and a sole coupled to the upper. In some embodiments, the sole includes a continuous dispensed component that forms a first layer and a second layer. In some embodiments, the first layer is aligned with the second layer. In some embodiments, the continuous dispensed component forms a medial sidewall and a lateral sidewall. In some embodiments, the first layer includes a starting point where the continuous dispensed component is first dispensed. In some embodiments, the continuous dispensed component continuously transitions from the first layer to the second layer at the starting point.

In some embodiments, the continuous dispensed component extends around a perimeter of the article of footwear. In some embodiments, the upper includes a dispensed component. In some embodiments, the continuous dispensed component is directly coupled to the upper. In some embodiments, the sole includes a substrate disposed between the upper and the continuous dispensed component. In some embodiments, the upper includes a circular knit material. In some embodiments, the continuous dispensed component forms additional layers.

In some embodiments, a method of making a sole for an article of footwear includes continuously dispensing a component to form a first layer of a medial sidewall and a lateral sidewall. In some embodiments, the first layer begins at a location and ends at the location. In some embodiments, the method also includes continuously dispensing the component to form a step up region at the location and continuously dispensing the component to form a second layer of the medial sidewall and the lateral sidewall. In some embodiments, the second layer is disposed on top of the first layer and begins and ends at the location. In some embodiments, the second layer is continuous with the step up region and the first layer.

In some embodiments, the method also includes continuously dispensing additional layers of the medial sidewall and the lateral sidewall. In some embodiments, the first layer is continuously dispensed onto an upper of the article of footwear. In some embodiments, the first layer is continuously dispensed onto a circular knit material disposed around a last. In some embodiments, the first layer is continuously dispensed onto another component of the sole. In some embodiments, the location is disposed at a medial edge of the sole.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
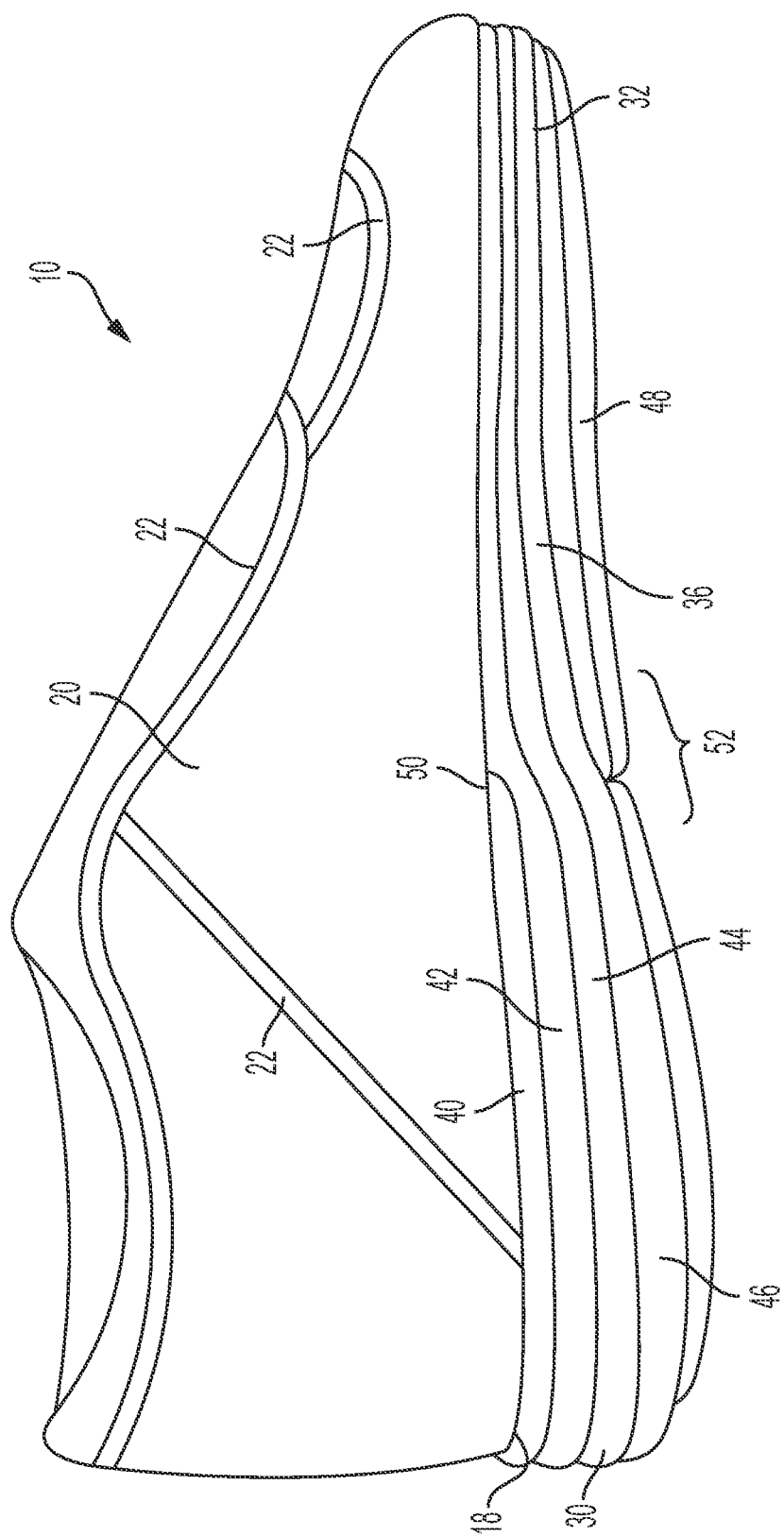
FIG. 1 shows a medial perspective view of an article of footwear according to some embodiments.

The present invention will now be described in detail with reference to embodiments thereof as illustrated in the accompanying drawings, in which like reference numerals are used to indicate identical or functionally similar elements. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The following examples are illustrative, but not limiting, of the present invention. Other suitable modifications and adaptations of the variety of conditions and parameters normally encountered in the field, and which would be apparent to those skilled in the art, are within the spirit and scope of the invention.

Embodiments of the present invention provide articles of footwear having one or more dispensed components created by an automated dispensing process. It is understood that while the term "dispensed" is generally used herein to refer to certain materials, these materials may also be "extruded." Thus, the term "dispensed component" includes components that are dispensed and components that are extruded. These dispensed components may be dispensed from a mechanical device. In some embodiments, the dispensed components are 3-D printed. In some embodiments, the dispensed components are not 3-D printed.

In some embodiments, an upper and/or a sole of the article of footwear may have one or more dispensed components. In some embodiments, an upper and/or a sole, or portions thereof, can be formed from one or more dispensed components. In some embodiments, the dispensed component can be a single, continuous piece of solid material. A dispensed footwear component can have advantages over traditionally-formed components, such as those made by casting, pouring, injection molding, screen-printing, or thermo-plastically forming. For example, a dispensed component can be customized without having to machine a new, expensive mold. The use of dispensed components can also allow for the use of shapes and geometries that are difficult to achieve using conventional upper or bottom molding techniques. Moreover, the data and knowledge to make a dispensed component can be quickly deployed to any location that houses equipment and material suitable for processing.

Various physical properties of the dispensed component can be manipulated, adjusted, altered, and/or modified. For example, in some embodiments, the width, length, shape, wall thickness, color, density, elasticity, material, viscosity, hardness, number of layers, etc. of the dispensed component can vary along the dispensed component or between a first and second dispensed component. As an example, a dispensed component on an upper may be less viscous than a dispensed component on a sole, which can help the dispensed component on the upper lay flat. As another example, a dispensed upper component may be rigid in a first portion, flexible in a second portion that is continuous with the first portion, and rigid in a third portion that is continuous with the second portion. The dispensed upper component may similarly vary in other characteristics, such as color or in the number of layers.

In some embodiments, the dispensed component can be made of rubber, foam (e.g., dispensed polyurethane foam), silicone, plastic including thermoplastic (e.g., polyurethane (such as TPU), nylon, or polypropylene), or any other suitable material. In some embodiments, the dispensed component can be made of a composite material. In some embodiments, the cross-section of the dispensed component can be substantially circular, oval, rectangular, triangular, square, or any other suitable shape or design (e.g., star-shaped). In some embodiments, the cross-section of the dispensed component can be relatively flat (i.e., low profile). Moreover, the cross-section of the dispensed component may be adjusted dynamically and may vary throughout the automated dispensing process.

In some embodiments, the dispensed component can be dispensed directly onto the article of footwear, such as directly onto the sole (e.g., insole, midsole, and/or outsole) or the upper. For example, the dispensed component can be dispensed directly onto a formed upper on a last (e.g., a flat knit upper, a circular knit upper, a formed three-dimensional knit, a sock, a fully-finished traditionally-lasted upper, etc.). The upper may be made of a textile fabric, leather, synthetic, or film product. In some embodiments, the dispensing or extruding is done automatically (i.e., robotically). In some embodiments, a scanner may scan the upper and then robotically dispense the dispensed component onto the upper based on the scan.

In some embodiments, the dispensed component may bond (e.g., by thermal fusion, chemical adhesion, or mechanical locking) to a portion of the article of footwear. In some embodiments, the dispensed component may form a portion of the sole of the article of footwear. In some embodiments, one or more dispensed components may form the entire sole of the article of footwear. In some embodiments, a single, continuous dispensed component forms a medial sidewall and a lateral sidewall. In some embodiments, the sidewalls each have multiple layers (all formed from the single, continuous dispensed component). In some embodiments, the layers are disposed directly on top of each other so that they are aligned with each other. In some embodiments, the continuous dispensed component has a starting point (i.e., where it is first dispensed). In some embodiments, each layer begins and ends at the starting point and the continuous dispensed component continuously dispenses to form a step up region from one layer to the next. Forming the sole with a dispensed component may provide flexibility and speed in development and manufacturing of the sole, while still meeting the functional and aesthetic purposes of the sole.

In some embodiments, the article of footwear may include or utilize any of the extruded/dispensed components or other features disclosed in U.S. application Ser. No. 14/455,650, filed Aug. 8, 2014, U.S. application Ser. No. 14/945,077, filed Nov. 18, 2015, U.S. application Ser. No. 15/644,463, filed Jul. 7, 2017, and/or U.S. application Ser. No. 15/831, 851, filed Dec. 5, 2017, the disclosures of which are incorporated herein in their entireties by reference thereto.

In some embodiments, dispensed components may be utilized in an article of footwear 10, as shown, for example, in FIG. 1. In some embodiments, article of footwear 10 comprises an upper 20 and a sole 30. In some embodiments, upper 20 and sole 30 are coupled together. In some embodiments, upper 20 comprises one or more dispensed components 22. In some embodiments, sole 30 comprises one or more dispensed components 32. In some embodiments, article of footwear 10 comprises both upper dispensed component(s) 22 and sole dispensed component(s) 32 (see FIG. 1). However, in some embodiments, article of footwear 10 may include either sole dispensed component(s) 32 or upper dispensed component(s) 22, and not both.

In some embodiments, dispensed components 22, 32 may be dispensed onto a surface so as to provide a dispensed component that extends above the surface at a certain width and height profile. In some embodiments, the height, width, or geometry or physical appearance/characteristic of the dispensed components may be dynamically changed as the components are dispensed onto article of footwear 10, such as onto upper 20, sole 30, or another surface (e.g., another layer of a dispensed component). In some embodiments, the geometry or physical appearance/characteristics of the dispensed components may be changed by dynamically changing the height of the nozzle (relative to the dispensing surface or substrate) from which the material, used to form the component, is dispensed. In some embodiments, the geometry or physical appearance/characteristics of the dispensed components may be changed by dynamically changing the speed at which the nozzle is moving as the material is dispensed and the component is formed. In some embodiments, the geometry or physical appearance/characteristics of the dispensed components may be changed by dynamically changing the flow rate of the material that is dispensed. Other parameters may be changed to dynamically change the height, width, or other characteristic of the dispensed components. In some embodiments, the density or viscosity of the dispensed components may be changed.

Upper 20 may be made of a variety of materials (e.g., a textile fabric, woven or knit goods, leather, synthetic, a film product, etc.). For example, upper 20 may be a circular knit material. In some embodiments, upper 20 may be made of a combination of these materials.

At least a portion of sole 30 may be made with dispensed component 32. Dispensed component 32 may provide a sole 30 that fulfills both functional and aesthetic purposes and can be manufactured efficiently. In some embodiments, sole 30 is made entirely of one or more dispensed components 32.

Figure 2:
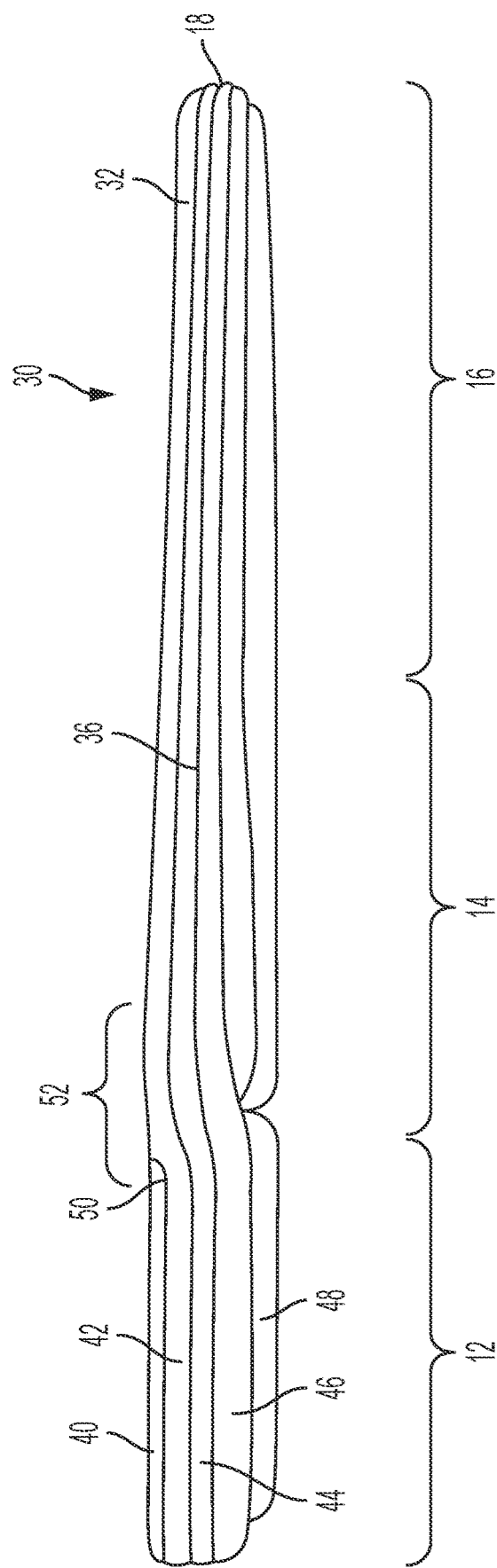
FIG. 2 shows a medial side view of a sole for an article of footwear according to some embodiments.

In some embodiments, dispensed component 32 forms a medial sidewall 36 (see FIGS. 1-2). In some embodiments, dispensed component 32 forms a lateral sidewall 38 (see FIG. 3). In some embodiments, dispensed component 32 forms a perimeter 18 of sole 30. In some embodiments, perimeter 18 extends around the entire perimeter of article of footwear 10. In some embodiments, perimeter 18 (including medial sidewall 36 and lateral sidewall 38) is formed by a single, continuous dispensed component 32.

In some embodiments, continuous dispensed component 32 forms a plurality of layers 40, 42, 44, 46 to form medial sidewall 36 and lateral sidewall 38. In some embodiments, first layer 40 of continuous dispensed component 32 is dispensed directly onto a bottom surface of the upper 20 to form at least a portion of sole 30 (see FIGS. 1 and 5). In some embodiments, first layer 40 of continuous dispensed component 32 is dispensed onto a substrate 28 (see FIG. 9). In some embodiments, subsequent layers are dispensed directly onto the previous layer. Thus, in the completed sole 30, first layer 40 may be disposed directly on top of second layer 42, second layer 42 may be disposed directly on top third layer 44, and third layer 44 may be disposed directly on top of fourth layer 46. In some embodiments, each of layers 40, 42, 44, 46 are aligned with each other.

In some embodiments, first layer 40 comprises a starting point at location 50 where continuous dispensed component 32 is first dispensed. In some embodiments, location 50 is disposed at a medial edge of sole 30. In some embodiments, location 50 is disposed at a lateral edge of sole 30. In some embodiments, location 50 is disposed in a midfoot 14 of sole 30, as shown, for example, in FIG. 2. In some embodiments, location 50 is disposed in a heel 12 or a forefoot 16 of sole 30.

In some embodiments, first layer 40 extends from location 50 around perimeter 18 of sole 30 until it again reaches location 50. Thus, first layer 40 may begin and end at location 50. In some embodiments, continuous dispensed component 32 continues to be dispensed onto first layer 40, thus forming second layer 42. Second layer 42 may follow first layer 40 around perimeter 18 of sole 30 until it reaches location 50. For example, second layer 42 may be aligned with first layer 40. Thus, second layer 42 may begin and end at location 50. In some embodiments, second layer 42 is dispensed onto first layer 40 so that first layer 40 is disposed directly on top of second layer 42.

Figure 3:
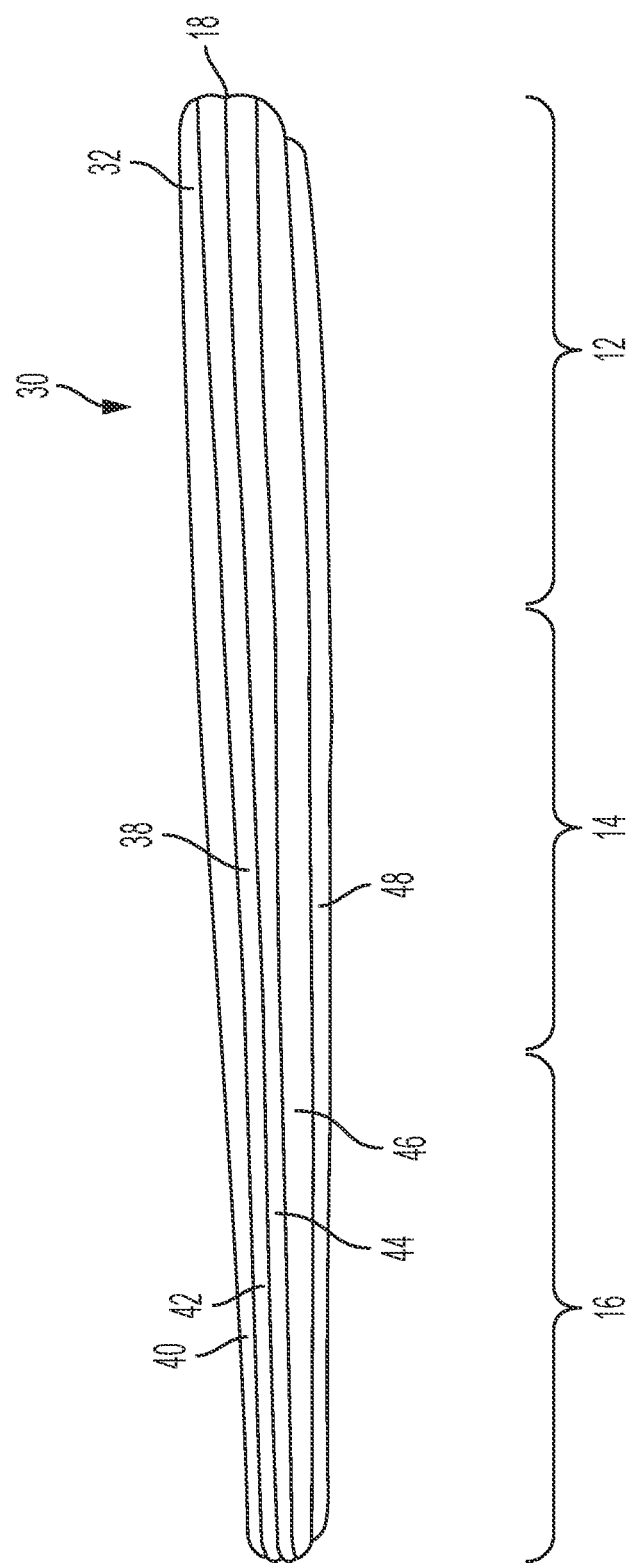
FIG. 3 shows a lateral side view of a sole for an article of footwear according to some embodiments.

Additional layers, such as third layer 44 and fourth layer 46, may be formed using the same dispensing process. This dispensing process forms a step up region 52 disposed at location 50. At step up region 52, continuous dispensed component 32 steps up from one layer to the next. Thus, multiple layers (for example, each of layers 40, 42, 44, 46) may be formed from a single continuous dispensed component 32. The combined layers 40, 42, 44, 46 may form both medial sidewall 36 (as shown in FIG. 2) and lateral sidewall 38 (as shown in FIG. 3). In some embodiments, the continuous dispensed component 32 forms a perimeter of sole 30. In some embodiments, the continuous dispensed component 32 extends around a perimeter of article of footwear 10.

Figure 5:
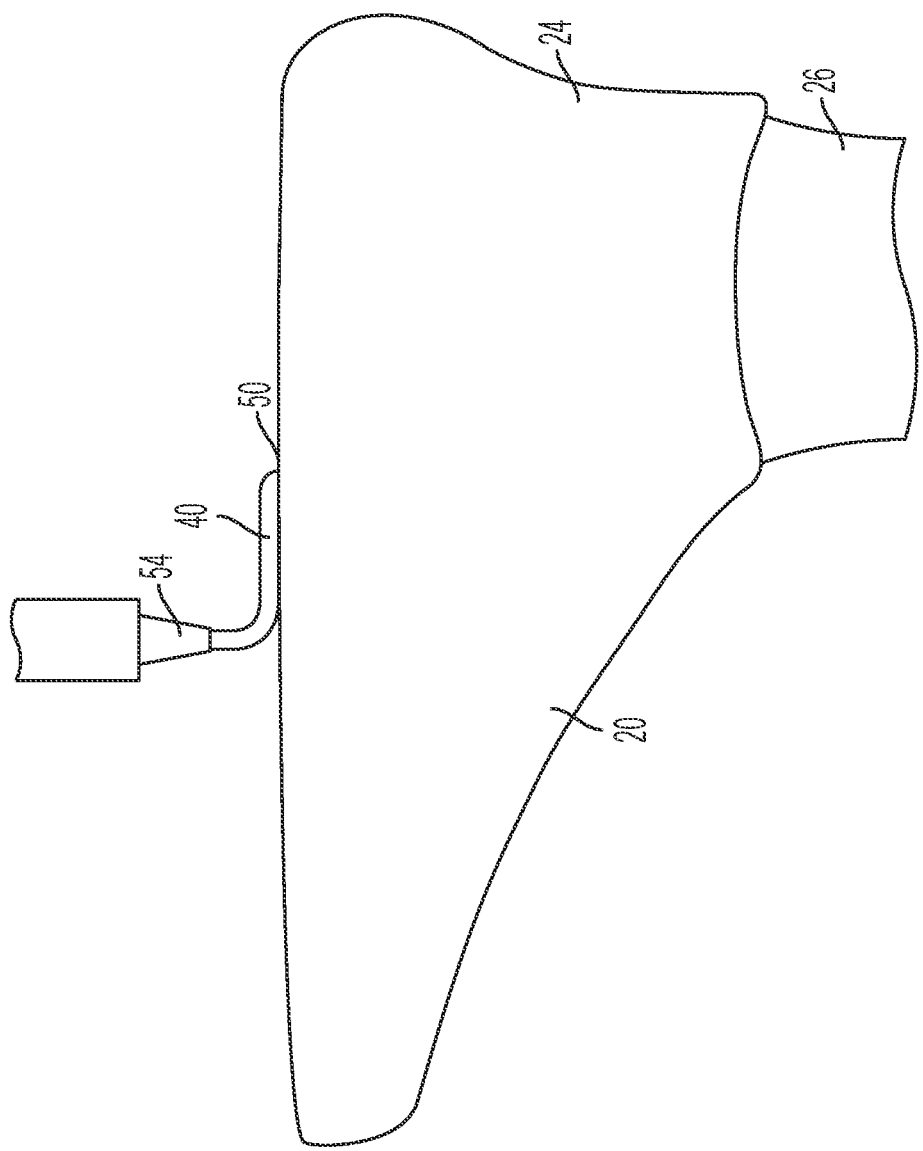
FIG. 5 shows a side view of a continuous dispensed component forming a first layer of a sole for an article of footwear according to some embodiments.
Figure 6:
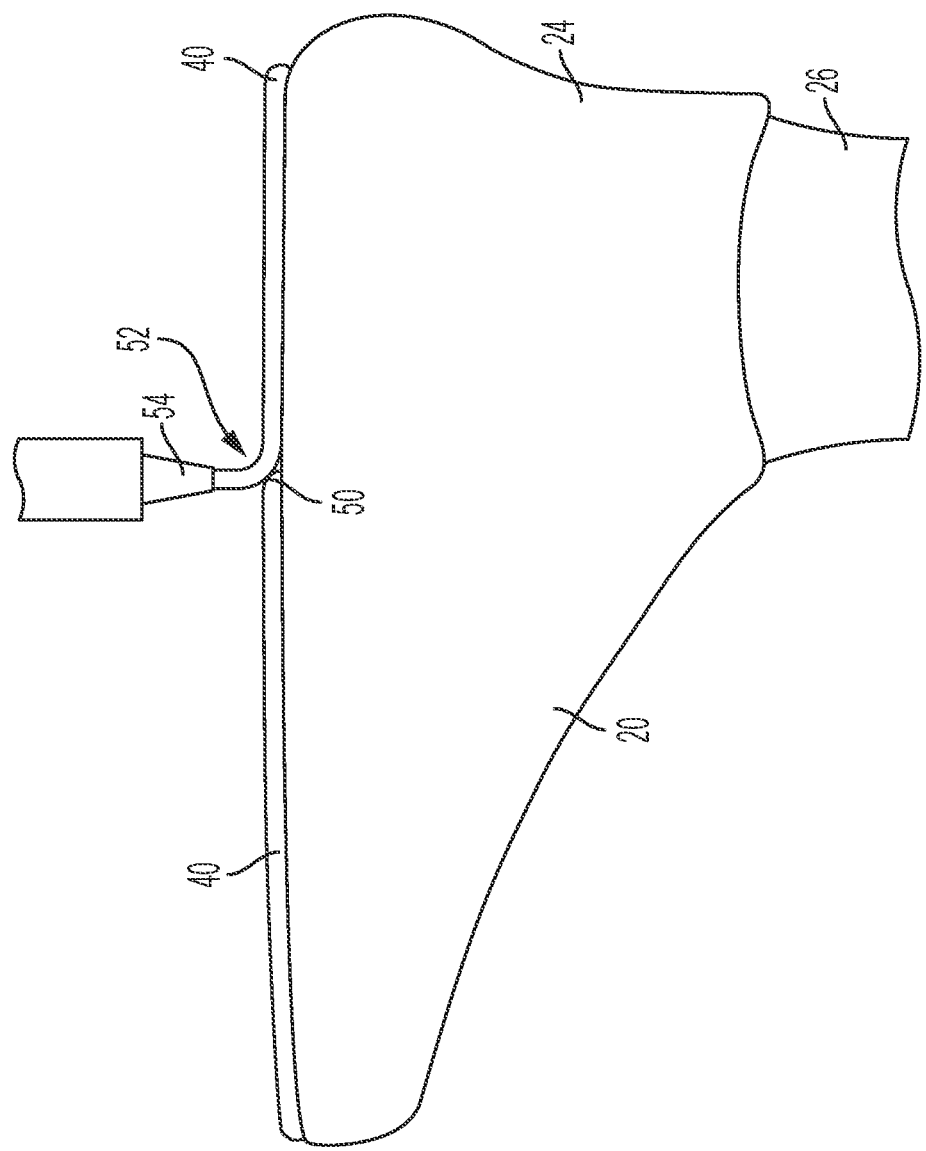
FIG. 6 shows a side view of a continuous dispensed component forming a step up region of a sole for an article of footwear according to some embodiments.
Figure 7:
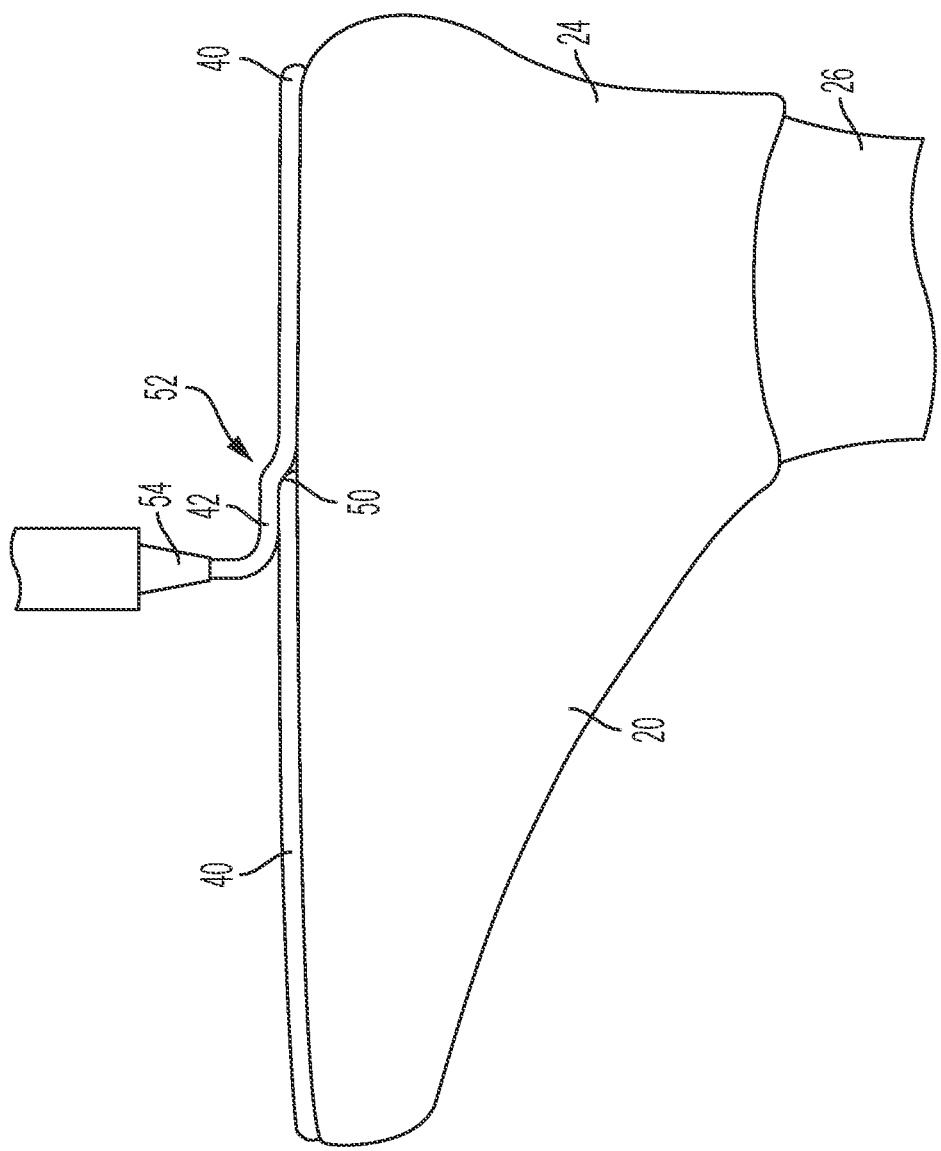
FIG. 7 shows a side view of a continuous dispensed component forming a second layer of a sole for an article of footwear according to some embodiments.

FIGS. 5-7 illustrate an example dispensing process to form sole 30 with continuous dispensed component 32. In some embodiments, continuous dispensed component 32 is dispensed directly onto upper 20 to form sole 30. For example, in some embodiments, upper 20 is disposed on a last 26. In some embodiments, upper 20 may be a knit material, such as a circular knit material 24 (see FIGS. 5-7). In some embodiments, upper 20 comprises a flat knit material. In some embodiments, upper 20 comprises a woven material. In some embodiments, upper 20 comprises a leno woven material. In some embodiments, upper 20 comprises a mesh. Other types of materials may also be used for upper 20 with the dispensing process.

In some embodiments, as shown, for example, in FIGS. 5-7, the component is dispensed from a nozzle 54. In some embodiments, the relative position of nozzle 54 and upper 20 is adjustable. In some embodiments, nozzle 54 is movable. In some embodiments, last 26 is movable. In some embodiments, both nozzle 54 and last 26 are movable. Nozzle 54 may be disposed at location 50 when it begins dispensing. In some embodiments, nozzle 54, last 26, or both begins to move when nozzle 54 starts dispensing. As the relative position of nozzle 54 and upper 20 changes, nozzle 54 continuously dispenses first layer 40, as shown in FIG. 5. Any pattern may be used for first layer 40. In some embodiments, the pattern of first layer 40 goes around the perimeter of upper 20 to form perimeter 18 of sole 30.

In some embodiments, nozzle 54 returns again to location 50, as shown, for example, in FIG. 6. As nozzle 54 passes over location 50, nozzle 54 continues to dispense a continuous component, thus forming step up region 52 where continuous dispensed component 32 steps up from first layer 40 to second layer 42. Thus, the transition from first layer 40 to second layer 42 may be a smooth transition without discontinuity. In some embodiments, second layer 42 is continuous with step up region 52 and first layer 40. In some embodiments, continuous dispensed component 32 continuously transitions from first layer 40 to second layer 42 at the starting point or location 50.

In some embodiments, nozzle 54 continues to dispense component 32 to form second layer 54, as shown, for example, in FIG. 7. As discussed above, second layer 42 may be aligned with first layer 40. Thus, when article of footwear 10 is in use, first layer 40 is disposed directly on top of second layer 42. Additional layers (e.g., third layer 44 and fourth layer 46) may be formed by continuing this same dispensing process. Each transition between layers is located at step up region 52, which is at location 50.

Figure 9:
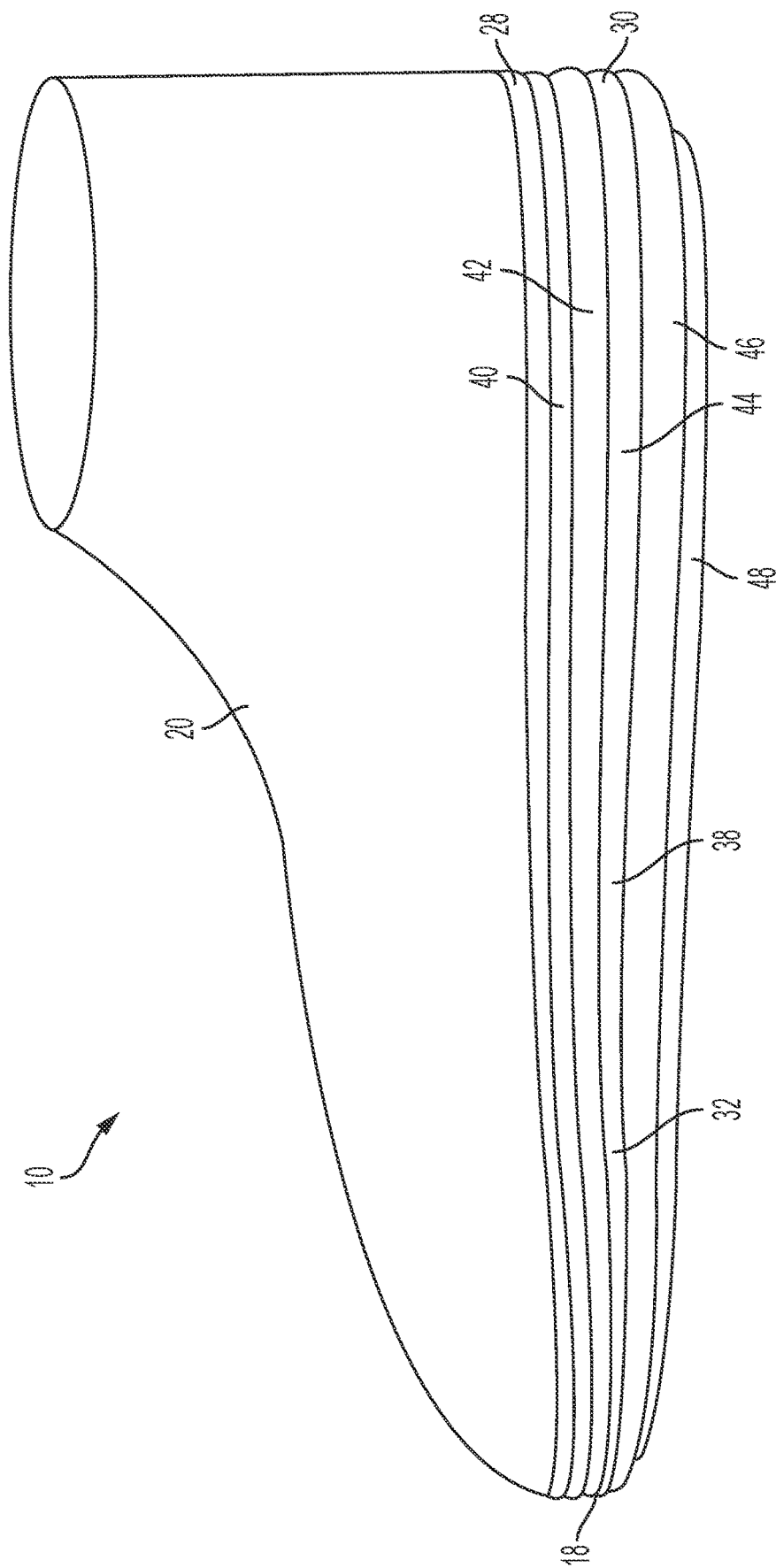
FIG. 9 shows a lateral side view of an article of footwear according to some embodiments.

A similar dispensing process may be used even when continuous dispensed component 32 is not dispensed directly onto upper 20. For example, sole 30 may include a substrate 28 (see FIG. 9) and continuous dispensed component 32 may be dispensed onto substrate 28 in a similar manner as the process described with respect to FIGS. 5-7. As shown in FIG. 9, in some embodiments, substrate 28 is disposed between upper 20 and continuous dispensed component 32.

This dispensing process forms an aesthetically pleasing sole. Other than step up region 52, each layer 40, 42, 44, 46 appears to be a distinct layer separate from other layers, giving sole 30 a clean look, as shown, for example, in FIG. 3. Even at step up region 52, because each layer steps up together, sole 30 maintains a clean look, as shown, for example, in FIG. 2.

Figure 4:
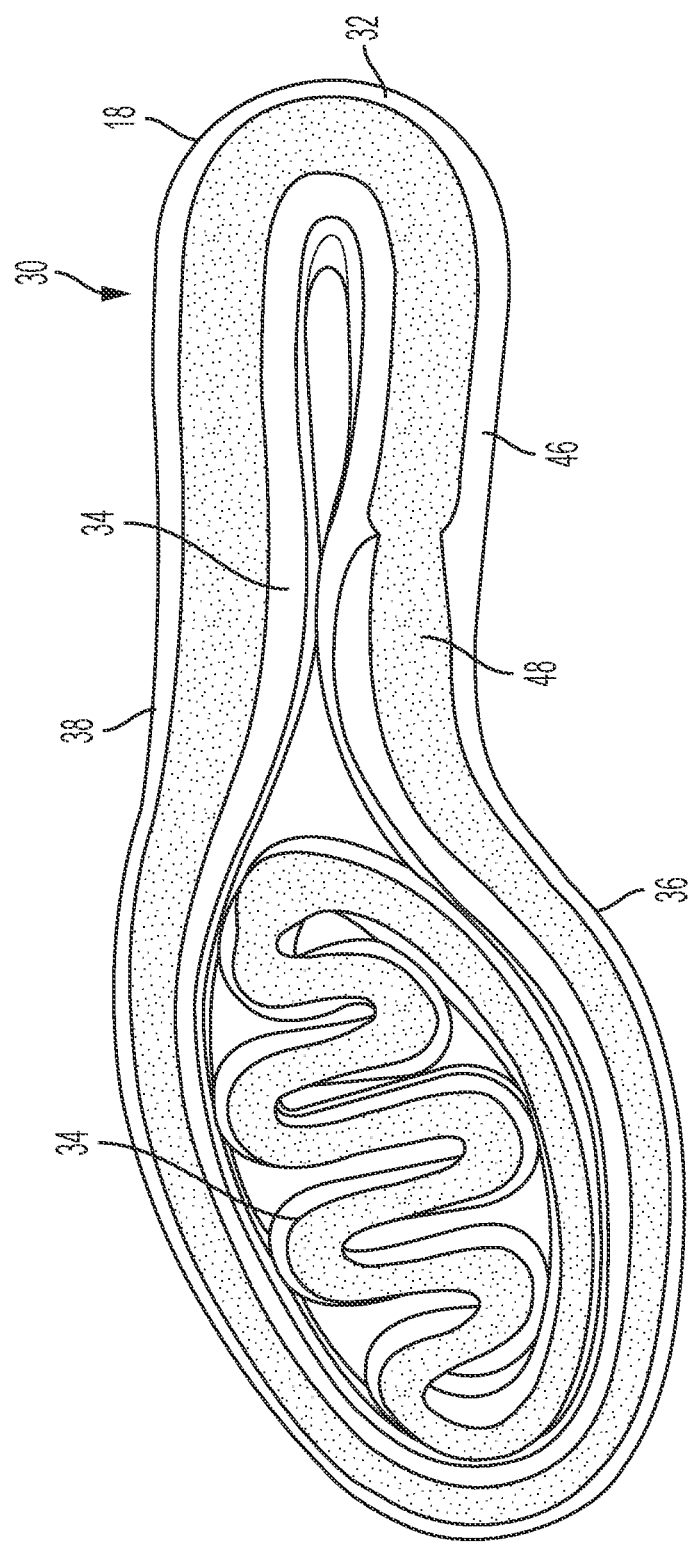
FIG. 4 shows a bottom view of a sole for an article of footwear according to some embodiments.
Figure 8:
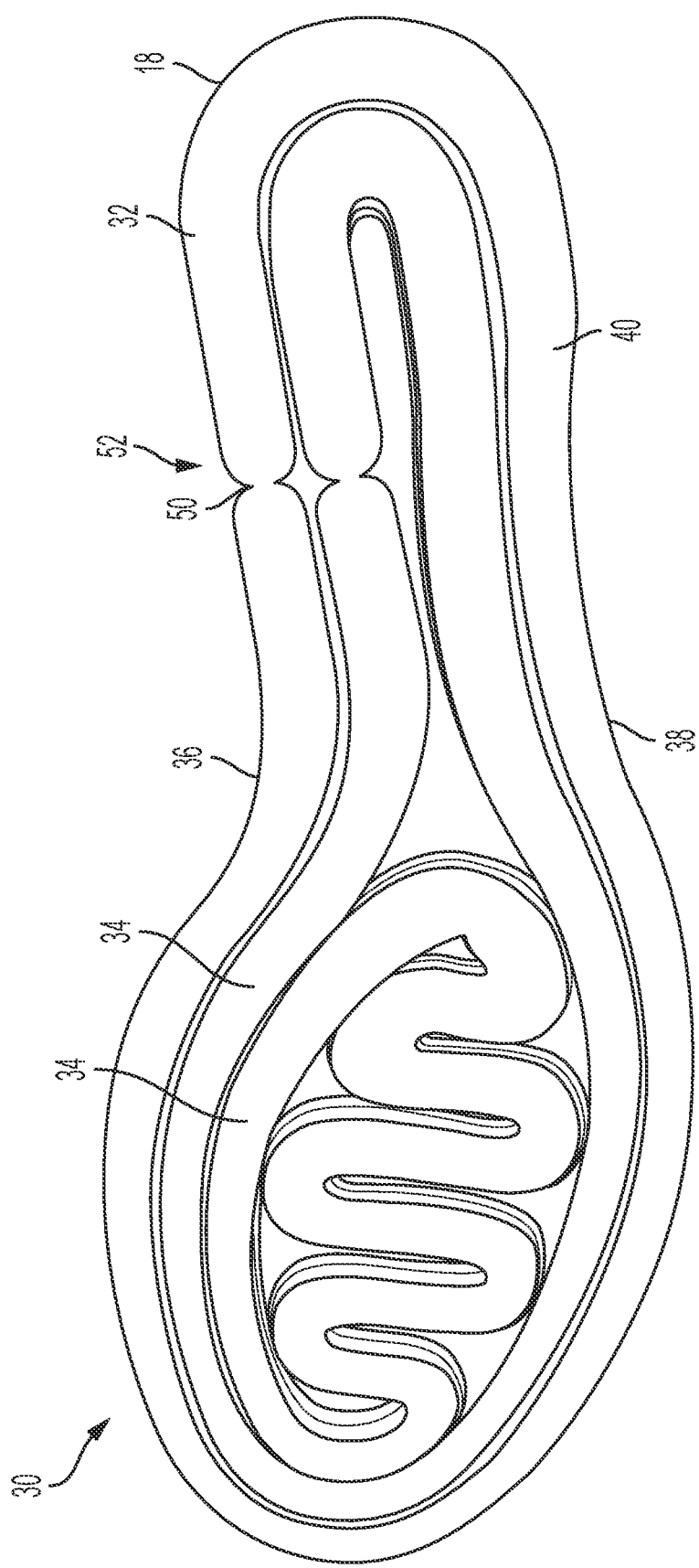
FIG. 8 shows a top view of a sole for an article of footwear according to some embodiments.

In some embodiments, sole 30 comprises one or more additional components 34 in addition to dispensed component 32, as shown, for example, in FIGS. 4 and 8. In some embodiments, additional components 34 may be disposed within perimeter 18 (e.g., between medial sidewall 36 and lateral sidewall 38), as shown, for example, in FIG. 4. In some embodiments, additional component 34 is a non-dispensed component. In some embodiments, as in FIG. 4, additional component 34 is a dispensed component. In some embodiments, sole 30 includes an additional component 34 that is formed with a dispensed component in a similar manner as described above with respect to continuous dispensed component 32, but is dispensed within continuous dispensed component 32, as shown in FIGS. 4 and 8. For example, sole 30 in FIGS. 4 and 8 includes additional component 34 that follows along an interior side of continuous dispensed component 32, thus forming a smaller version of medial sidewall 36 and lateral sidewall 38 within perimeter 18. In some embodiments, additional component 34 may be dispensed with a different pattern than continuous dispensed component 32. For example, as shown in FIGS. 4 and 8, sole 30 may include an additional component 34 disposed in forefoot 16. Although additional component 34 may have a different pattern, the formation of layers may be the same as continuous dispensed component 32. Additional components 34 may function to provide additional support for the wearer.

In some embodiments, sole 30 comprises an outsole 48. In some embodiments, outsole 48 comprises a non-dispensed component. In some embodiments outsole 48 comprises a dispensed component 32. In some embodiments, outsole 48 may be formed with the same continuous dispensed component 32 that forms layers 40, 42, 44, 46. In some embodiments, even where outsole 48 is the same continuous dispensed component 32 that forms layers 40, 42, 44, 46, at least one characteristic of dispensed component is different for outsole 48 than for the other layers 40, 42, 44, 46. For example, outsole 48 may be a different color, viscosity, density, thickness, etc., or a combination of these characteristics. In some embodiments, outsole 48 is disposed on continuous dispensed component 32 and additional components 34 (see FIG. 4). In some embodiments, outsole 48 includes multiple, distinct pieces. For example, outsole 48 may include a first piece that is disposed on continuous dispensed component 32 and an additional component 34 and a second piece that is disposed only on a different additional component 34. In some embodiments, outsole 48 includes only a single piece.

Various embodiments described herein provide an article of footwear that protects and cushions the wearer's foot, while also fulfilling aesthetic purposes. Moreover, manufacturing this article of footwear is efficient. Further variations of the embodiments described above may also be provided.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A sole for an article of footwear, the sole comprising:
a continuous dispensed component forming a first layer and a second layer;
wherein the first layer is disposed directly on top of the second layer,
wherein the continuous dispensed component forms a perimeter of the sole and forms a medial sidewall and a lateral sidewall,
wherein the first layer comprises a starting point disposed at an edge of the sole where the continuous dispensed component is first dispensed,
wherein the first layer is a top layer of the sole and extends entirely around the perimeter of the sole, and
wherein the continuous dispensed component continuously transitions from the first layer to the second layer at the starting point such that the continuous dispensed component forms a step up region at the starting point that is continuous with the first layer and the second layer.

2. The sole of claim 1, wherein the continuous dispensed component forms additional layers.

3. The sole of claim 2, wherein the second layer is disposed directly on top of the additional layers.

4. The sole of claim 1, wherein the starting point is disposed at a midfoot of the sole.

5. The sole of claim 1, further comprising an additional dispensed component disposed within the perimeter of the sole.

6. The sole of claim 1, further comprising a non-dispensed component disposed within the perimeter of the sole.

7. The sole of claim 1, further comprising a second continuous dispensed component extending along an entire interior side of the continuous dispensed component.

8. The sole of claim 7, further comprising an outsole disposed on the continuous dispensed component and the second continuous dispensed component.

9. The sole of claim 1, wherein the starting point is disposed at a lateral edge of the sole.

10. An article of footwear comprising:
an upper; and
a sole coupled to the upper, the sole comprising a continuous dispensed component forming a first layer and a second layer,
wherein the first layer is aligned with the second layer,
wherein the continuous dispensed component forms a perimeter of the sole and forms a medial sidewall and a lateral sidewall,
wherein the first layer comprises a starting point disposed at an edge of the sole where the continuous dispensed component is first dispensed,
wherein the first layer is a top layer of the continuous dispensed component and extends entirely around the perimeter of the sole, and
wherein the continuous dispensed component continuously transitions from the first layer to the second layer at the starting point such that the continuous dispensed component forms a step up region at the starting point that is continuous with the first layer and the second layer.

11. The article of footwear of claim 10, wherein the upper comprises a dispensed component.

12. The article of footwear of claim 10, wherein the continuous dispensed component is directly coupled to the upper.

13. The article of footwear of claim 10, wherein the sole comprises a substrate disposed between the upper and the continuous dispensed component.

14. The article of footwear of claim 13, wherein the first layer is formed on the substrate.

15. The article of footwear of claim 10, wherein the upper comprises a circular knit material.

16. The article of footwear of claim 11, wherein the continuous dispensed component forms additional layers.

17. The article of footwear of claim 10, wherein the sole further comprises a second continuous dispensed component extending along an entire interior side of the continuous dispensed component.

18. The article of footwear of claim 17, wherein the sole further comprises an outsole disposed on the continuous dispensed component and the second continuous dispensed component.

19. The article of footwear of claim 10, wherein the starting point is disposed at a lateral edge of the sole.

* * * * *

UNITED STATES PATENT AND TRADEMARK OFFICE
CERTIFICATE OF CORRECTION

PATENT NO. : 11,278,081 B2
APPLICATION NO. : 16/156681
DATED : March 22, 2022
INVENTOR(S) : Boudreau et al.

It is certified that error appears in the above-identified patent and that said Letters Patent is hereby corrected as shown below:

In the Claims

In Column 10, Line 13, (Claim 16) replace "claim 11" with --claim 10--.

Signed and Sealed this
Fifth Day of July, 2022

Katherine Kelly Vidal
*Director of the United States Patent and Trademark Office*